United States Patent
Sonawane et al.

(10) Patent No.: US 11,468,060 B2
(45) Date of Patent: Oct. 11, 2022

(54) AUTOMATIC QUERY OFFLOADING TO A STANDBY DATABASE

(71) Applicant: Oracle International Corporation, Redwood Shores, CA (US)

(72) Inventors: Sachin Sonawane, Foster City, CA (US); Mahesh Girkar, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 210 days.

(21) Appl. No.: 16/016,978

(22) Filed: Jun. 25, 2018

(65) Prior Publication Data

US 2019/0392067 A1 Dec. 26, 2019

(51) Int. Cl.
*G06F 16/245* (2019.01)
*G06F 16/2453* (2019.01)
(Continued)

(52) U.S. Cl.
CPC .... *G06F 16/24542* (2019.01); *G06F 16/2379* (2019.01); *G06F 16/2435* (2019.01); *G06F 16/2457* (2019.01); *G06F 16/25* (2019.01)

(58) Field of Classification Search
None
See application file for complete search history.

(56) References Cited

U.S. PATENT DOCUMENTS 7,769,722 B1 * 8/2010 Bergant .............. G06F 16/184
 707/681
8,738,568 B2 5/2014 Ghosh
(Continued)

FOREIGN PATENT DOCUMENTS

| EP | 3 327 587 A1 | 5/2018 | |
|---|---|---|---|
| WO | WO 2013/041055 A1 | 3/2013 | |
| WO | WO-2013041055 A1 * | 3/2013 | ....... G06F 16/24552 |

OTHER PUBLICATIONS

Oracle, Oracle Active Data Guard Oracle Data Guard 11g, "Maximum Availability Architecture", Oracle Maximum Availability Architecture Oracle White Paper, dated Sep. 2011, 41 pages.
(Continued)

*Primary Examiner* — Alford W Kindred
*Assistant Examiner* — Cao D Vuong
(74) *Attorney, Agent, or Firm* — Hickman Becker Bingham Ledesma LLP

(57) ABSTRACT

Embodiments allow a primary database system ("primary") to automatically detect queries directed to the primary database that may be offloaded to a standby database system ("standby"), and then to automatically offload the offload-eligible queries to a standby. The primary identifies offload-eligible queries based on a record of up-to-date database objects within each standby that replicates the primary database. The record of up-to-date standby objects is updated based on heartbeat messages from each standby, and commit timestamps for transactions on the primary. Evaluation of whether a query is offload-eligible is triggered by one or more trigger conditions that include: inclusion of an offload optimizer hint in the query, an estimated run-time of the query, etc. Embodiments further allow an offloaded query over particular changed data in the primary database to access, on a standby database, uncommitted changes made to the particular data in the primary database.

26 Claims, 10 Drawing Sheets

(51) Int. Cl.
    *G06F 16/23*     (2019.01)
    *G06F 16/25*     (2019.01)
    *G06F 16/242*     (2019.01)
    *G06F 16/2457*     (2019.01)

(56) References Cited

U.S. PATENT DOCUMENTS

| | | | |
|---|---|---|---|
| 10,216,582 B2* | 2/2019 | Bourbonnais | G06F 11/1451 |
| 10,929,393 B2* | 2/2021 | Das | G06F 16/951 |
| 10,949,413 B2 | 3/2021 | Sonawane | |
| 2016/0179867 A1 | 6/2016 | Li | |
| 2016/0217042 A1* | 7/2016 | Wang | G06F 11/1448 |
| 2017/0116278 A1* | 4/2017 | Baby | G06F 16/27 |
| 2018/0046693 A1* | 2/2018 | Brodt | G06F 16/273 |

OTHER PUBLICATIONS

Oracle Database 12c "Oracle Database 12c—Global Data Services", Load Balancing and Service Failover for Replicated Databases, An Oracle White Paper dated Jun. 2013, 14 pages.

Sybase, Inc., "Using Sybase Failover in a High Availability System", https://infocenter.sybase.com/help/topic/com.sybase.dc31651_1251/pdf/ha_avail.pdf, Sep. 2003, 396pgs.

SAP, "How to Perform System Replication for SAP HANA", https://www.sap.com/docs/download/2013/10/26c02b58-5a7c-0010-82c7-eda71af511fa.pdf, SAP How-to-Guide, Business Analytics, Version 4.5, Dec. 2017, pp. 1-59.

Preston, W. Curtis, "Snapshot 101: CoSnapshot 101: Copy-on-write vs Redirect-on-writepy-on-write vs Redirect-on-write", https://storageswiss.com/2016/04/01/snapshot-101-copy-on-write-vs-redirect-on-write/, Apr. 1, 2016. Storage Switzerland, LLC, pp. 1-6.

Oracle Corp., "Technical Comparison of Oracle Database 12c vs. Microsoft SQL Server 2012: Focus on High Availability", Nov. 2013, Oracle White Paper, 68pgs.

Oracle Corp., "Oracle Active Data Guard: What's Really Under the Hood", https://web.archive.org/web/20121224132556/https://www.oracle.com/technetwork/database/features/availability/s316924-1-175932.pdf, (capture date from Archive.org), Dec. 24, 2012, 41pgs.

Oracle Corp, "Oracle Active Data Guard Real-Time Data Protection and Availability", Oracle White Paper, Oct. 2016, 1-21.

Knutsen, Lester, "Informix Best Practices Backup, Recovery, and High Availability Disaster Recovery (HDR)", https://advancedatatools.com/Downloads/InformixBestPractices-Backups+HDR.pdf, Apr. 20, 2017, Advanced DataTools, pp. 1-62.

IBM Redbooks, "High Availability and Disaster Recovery Options for DB2 for Linux, UNIX, and Windows", https://www.redbooks.IBM.com/redbooks/pdfs/sg247363.pdf, Oct. 18, 2012, IBM, pp. 1-584.

IBM Redbooks, "Content Manager OnDemand Backup, Recovery, and High Availability", ibm.com/redbooks, Oct. 2005, IBM, pp. 1-384.

* cited by examiner

302 — A FIRST DATABASE SYSTEM MAINTAINING A PRIMARY DATABASE THAT INCLUDES A SET OF DATA

304 — RECEIVING, AT THE FIRST DATABASE SYSTEM, A QUERY OVER THE SET OF DATA IN THE PRIMARY DATABASE

306 — THE FIRST DATABASE SYSTEM AUTOMATICALLY DETERMINING WHETHER TO OFFLOAD THE QUERY TO A SECOND DATABASE SYSTEM THAT MAINTAINS A STANDBY DATABASE THAT REPLICATES THE PRIMARY DATABASE

308 — IN RESPONSE TO DETERMINING TO OFFLOAD THE QUERY TO THE SECOND DATABASE SYSTEM, THE FIRST DATABASE SYSTEM AUTOMATICALLY OFFLOADING THE QUERY BY SUBMITTING, TO THE SECOND DATABASE SYSTEM, A REQUEST TO RUN THE QUERY OVER A COPY OF THE SET OF DATA IN THE STANDBY DATABASE

310 — RECEIVING, FROM THE SECOND DATABASE SYSTEM, RESULTS OF THE QUERY

312 — THE FIRST DATABASE SYSTEM RETURNING, TO THE USER AS RESULTS OF THE QUERY, THE QUERY RESULTS RECEIVED FROM THE SECOND DATABASE SYSTEM

FIG. 5A

LATEST-COMMIT TABLE 500

| OBJECT IDENTIFIERS | COMMIT SCN (510) | STANDBY 1 (210) (520) | STANDBY 2 (200) (530) | STANDBY 3 (170) (540) |
|---|---|---|---|---|
| EMPLOYEES TABLE | 190 | OK | OK | --- |
| JOBS TABLE | 210 | OK | --- | --- |
| LOCATIONS TABLE | 100 | OK | OK | OK |
| SSN TABLE | 190 | OK | OK | --- |
| TIMES TABLE | 240 | --- | --- | --- |

FIG. 5B

LATEST-COMMIT TABLE 500

| OBJECT IDENTIFIERS | COMMIT SCN (510) | STANDBY 1 (210) (520) | STANDBY 2 (200) (530) | STANDBY 3 (170) (540) |
|---|---|---|---|---|
| EMPLOYEES TABLE | 220 | ... | ... | ... |
| JOBS TABLE | 210 | OK | ... | ... |
| LOCATIONS TABLE | 100 | OK | OK | OK |
| SSN TABLE | 220 | ... | ... | ... |
| TIMES TABLE | 240 | ... | ... | ... |

FIG. 5C

| OBJECT IDENTIFIERS | COMMIT SCN 510 | STANDBY 1 (210) 520 | STANDBY 2 (200) 530 | STANDBY 3 (220) 540 |
|---|---|---|---|---|
| EMPLOYEES TABLE | 220 | -- | -- | OK |
| JOBS TABLE | 210 | OK | -- | OK |
| LOCATIONS TABLE | 100 | OK | OK | OK |
| SSN TABLE | 220 | -- | -- | OK |
| TIMES TABLE | 240 | -- | -- | -- |

LATEST-COMMIT TABLE 500

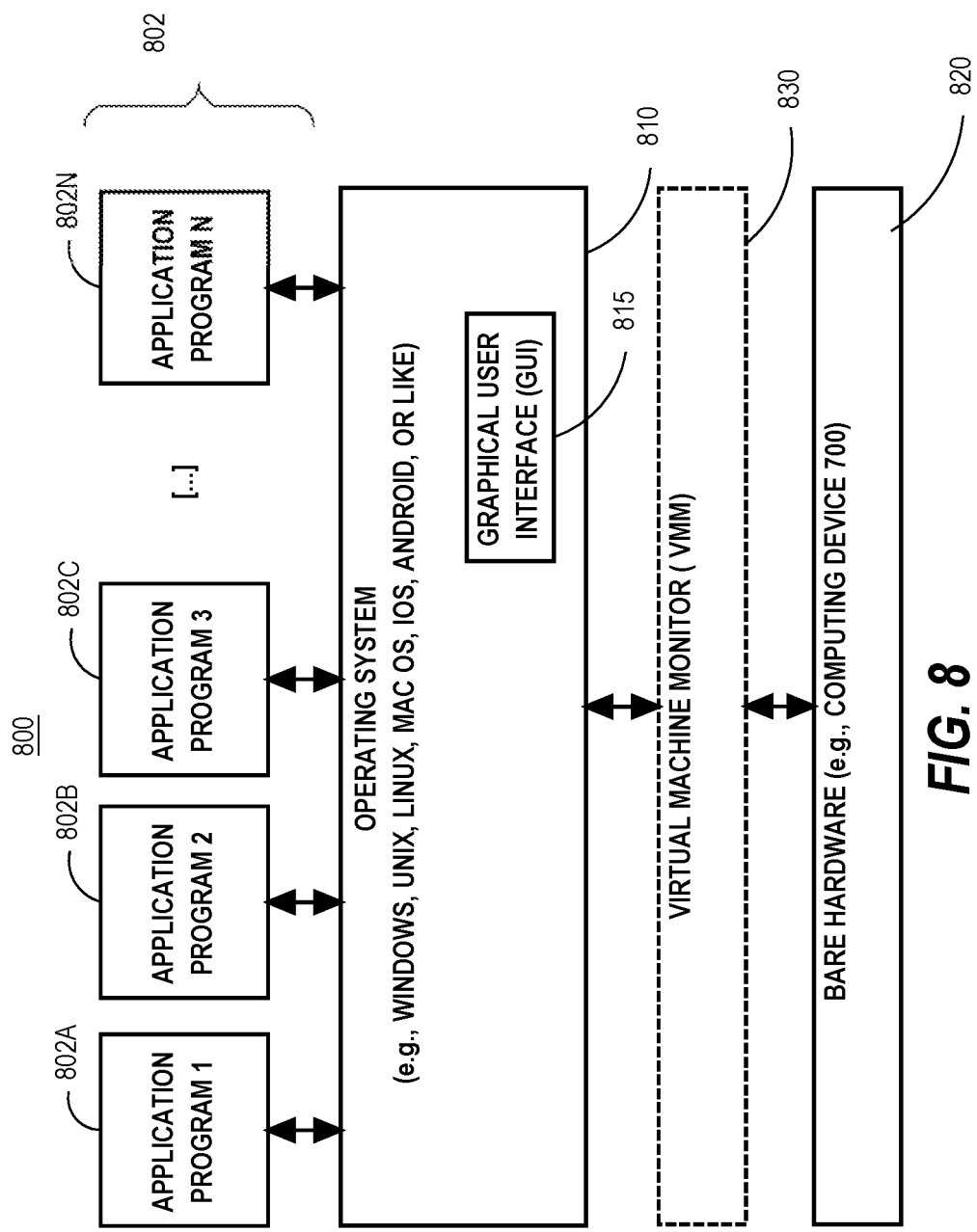

AUTOMATIC QUERY OFFLOADING TO A STANDBY DATABASE

CROSS-REFERENCE TO RELATED APPLICATIONS

This application is related to U.S. application Ser. No. 15/885,281, titled "Method And System For Supporting Data Consistency On An Active Standby Database After DML Redirection To A Primary Database", filed Jan. 31, 2018, the entire contents of which is incorporated by reference as if fully set forth herein.

FIELD OF THE INVENTION

The present invention relates to automatically detecting and offloading queries, initiated on a primary database, to a replica of the database without losing the correctness of query results.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In case of data corruption or system failure at a primary database, one or more physical or logical copies of the primary database may be maintained as separate databases known as standby databases. Thus, if the primary database fails, a failover to the standby database may be performed. Typically, the primary database and the standby database are maintained in separate database systems that are remotely connected. For example, FIG. 1 depicts multiple database systems that are communicatively coupled. Referring to FIG. 1, a primary database system 110 maintains a primary database 132, and a standby database system 140 maintains a standby database 162.

A primary database system and a standby database system may each correspond to any of a number of different types of database systems, such as a clustered database system (as depicted for standby database system 140), a single-server database system (as depicted for primary database system 110) and/or a multi-tenant database system (not depicted in FIG. 1). In the example of FIG. 1, primary database system 110 includes a database server computing device 120 and persistent storage 130. Database server computing device 120 runs a database server instance 122, which is a collection of memory and processes that interact with primary database 132. Database server instance 122 implements the server-side functions of primary database system 110.

Standby database system 140 includes database server computing devices 150A-N and persistent storage 160 (which may or may not be distributed among persistent storage of database server computing devices 150A-N). The label "N" in "150N," and in any other reference numeral herein, connotes that any number of elements, items, or sets of items may be present or used in embodiments, as in "1 to n items". Database server computing devices 150A-N correspond to clustered nodes that each run one of database server instances 152A-N. Each instance of instances 152A-N is a collection of memory and processes that interact with standby database 162. Instances 152A-N collectively implement server-side functions of standby database system 140. Standby database server computing devices 150A-N may communicate with each other via an interconnect (not shown).

In addition to residing on persistent storage 130 and persistent storage 160, as depicted in FIG. 1, primary database 132 and standby database 162 may each reside in volatile storage, such as volatile memory running on device 120 and/or on any of devices 150A-N. Furthermore, primary database 132 and standby database 162 may each be stored on a virtual disk and/or a set of physical disks.

Maintaining Consistency Between Databases

Maintaining consistency between a primary database and a standby database involves replicating changes to the primary database on the standby database. A standby database that maintains a physical replica of the primary database replicates the primary database on a block-by-block level. Thus, the system change numbers (SCNs) in a physical standby database represent the same database state as corresponding SCNs of the primary database being replicated. FIG. 2 is a block diagram that depicts an approach for maintaining consistency between a primary database and a standby database where the standby database is a physical replica of the primary database.

Referring to FIG. 2, transaction(s) 202 implement one or more changes to primary database 132. Primary database system 110 records the one or more changes in change records 206A-N, and sends these change records to standby database system 140 for replication. Example change records include redo records or redo information as described in U.S. patent application Ser. No. 11/818,975, filed Jan. 29, 2007; U.S. patent application Ser. No. 12/871,805, filed Aug. 30, 2010; U.S. patent application Ser. No. 13/161,315, filed Jun. 15, 2011; and U.S. patent application Ser. No. 14/337,179, filed Jul. 21, 2014, the entire contents of each of which are incorporated herein by reference.

Transaction(s) 202 implement one or more changes to primary database 132 based on one or more instructions that are processed as a single logical operation. Multiple data manipulation language (DML) operations (such as Structured Query Language commands "INSERT", "UPDATE", and "DELETE") and also queries over data may be processed as a single transaction. Any changes implemented within database data by a particular transaction are viewable only by the transaction itself prior to committing the transaction, and then are persisted (and made generally visible) when the transaction commits. Transaction(s) 202 that fail to commit may undergo a "rollback" operation that restores a previous version of data.

When a change is implemented at primary database 132, a current system change number (SCN) of the primary database increases. An SCN of a primary database represents a logical time that corresponds to a particular state of the primary database. For example, when a particular transaction begins, the current SCN of the primary database is at "1". When the particular transaction makes a particular change, the current SCN of the primary database advances to "2". When the particular transaction commits, the current SCN of the primary database advances to "3".

Executing Queries Against a Standby Database

A user may choose to initiate a query either on a primary database system maintaining a primary database or on a standby database system maintaining a standby database that replicates (either physically or logically) the primary database. Generally, queries issued directly to a primary database system must be fulfilled by the primary database system notwithstanding any available bandwidth of a standby database system for query execution. As such, the computing and querying capability of a standby database system cannot be automatically utilized to offload any portion of the workload running on a primary database system.

A user may initiate a query on standby database system 140 by connecting to database server instance 152A and issuing a database command directly to the database server instance. As another example, a user may initiate a query on standby database system 140 by connecting to primary database system 110, which maintains a database link to standby database system 140, and submitting a database command, which is explicitly directed over the database link, to the standby database system.

To illustrate, primary database system 110 maintains a database link to standby database system 140, where the name that uniquely identifies standby database system 140 in primary database system 110 is standby system 140. Creating such a database link automatically establishes a new session, on standby database system 140, in which all database commands issued over the database link will run. Thus, a user may initiate the following query on standby database system 140 by submitting the query to primary database server instance 122, where Employee@standby system 140 referred to by the query represents the copy of the Employee table in standby database 162:

```
SELECT * FROM Employee@standby_system_140
WHERE department_id = 30;
```

When this query is submitted to instance 122, the query is sent to standby database system 140 and run within the session, established for the database link by standby database system 140, over the copy of the Employee table within standby database 162. Standby database system 140 returns the query results to primary database system 110 via the previously-established database link and then primary database system 110 returns those results to the user that initiated the query.

Read-only transactions may be executed against a standby database instead of the corresponding primary database so that the primary database resources are freed for other tasks. However, because a standby database system replicates data from a primary database, read-write transactions generally should not be initiated in the standby database system. Thus, the workload of read-write transactions falls to the primary database system.

Furthermore, a standby database typically lags behind its primary database because the standby database replicates changes that are already implemented at the primary database. In other words, the standby database's state is continuously catching up to the primary database's state. The lag of the standby database impedes the ability to offload queries initiated in the primary database to the standby database. For example, if the primary database's current SCN is at 100, the standby database's latest-readable SCN may be at 75, and if the primary database's current SCN advances to 120, the standby database's latest-readable SCN may advance to 100.

It would be beneficial to, at the primary database level, automatically detect queries that can be redirected to a standby database and then to automatically offload, to the standby database system, the detected queries such that the offloaded queries are run as soon as possible and the resources of the primary database system are conserved.

BRIEF DESCRIPTION OF THE DRAWINGS

In the drawings:

FIG. 3 depicts a flowchart for a primary database system automatically determining whether to offload a particular query, directed to the primary database, to a target standby database system, and then automatically redirecting the query to the target standby database system without manual intervention.

FIGS. 5A-5C depict respective states of an example latest-commit table, which lists the latest-commit times of database objects and also indicates which database objects are up-to-date within each standby database system.

FIG. 8 is a block diagram of a basic software system that may be employed for controlling the operation of a computer system.

DETAILED DESCRIPTION

Figure 1:
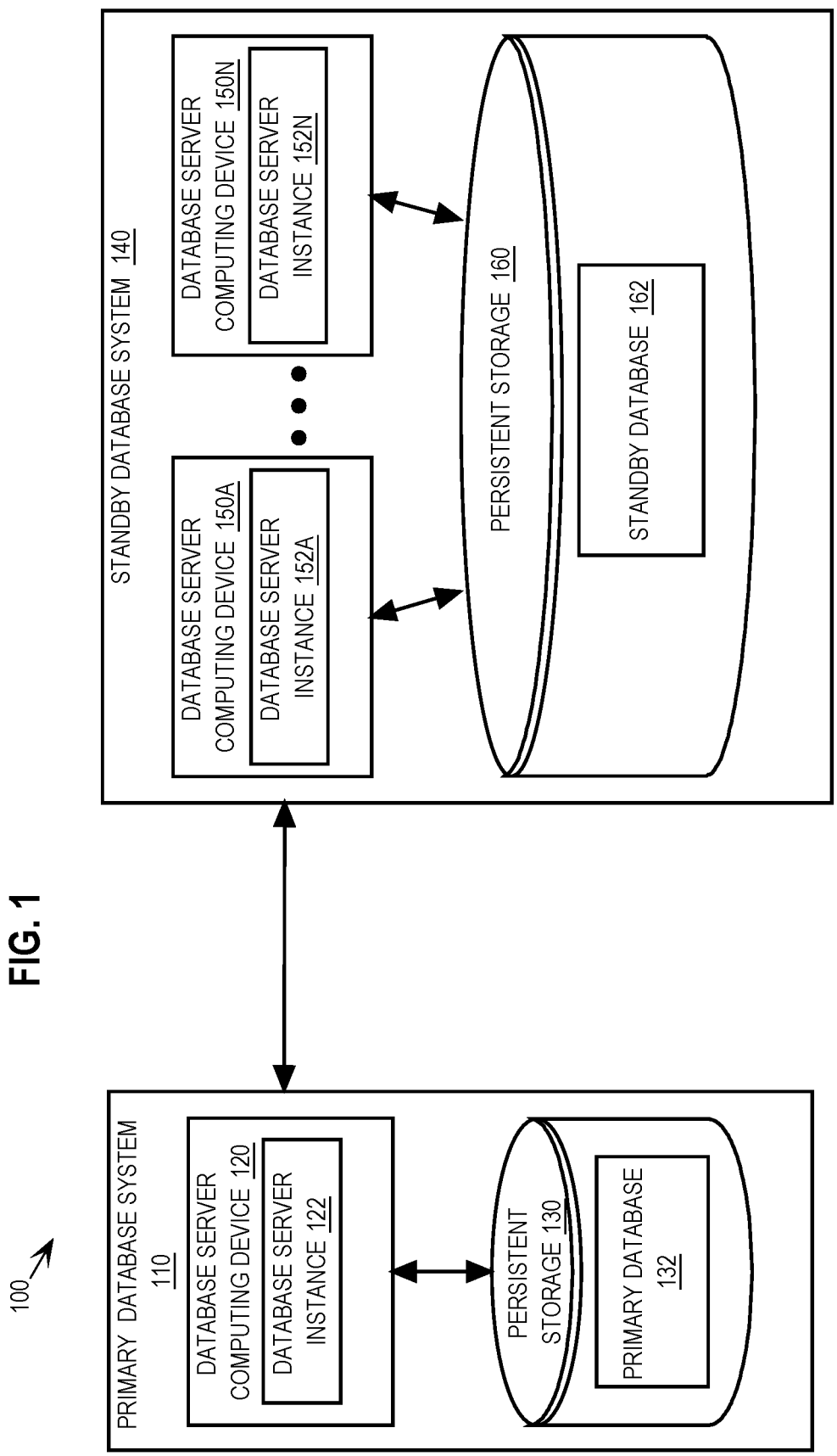
FIG. 1 depicts example primary and standby database systems on which embodiments may be implemented.
Figure 2:
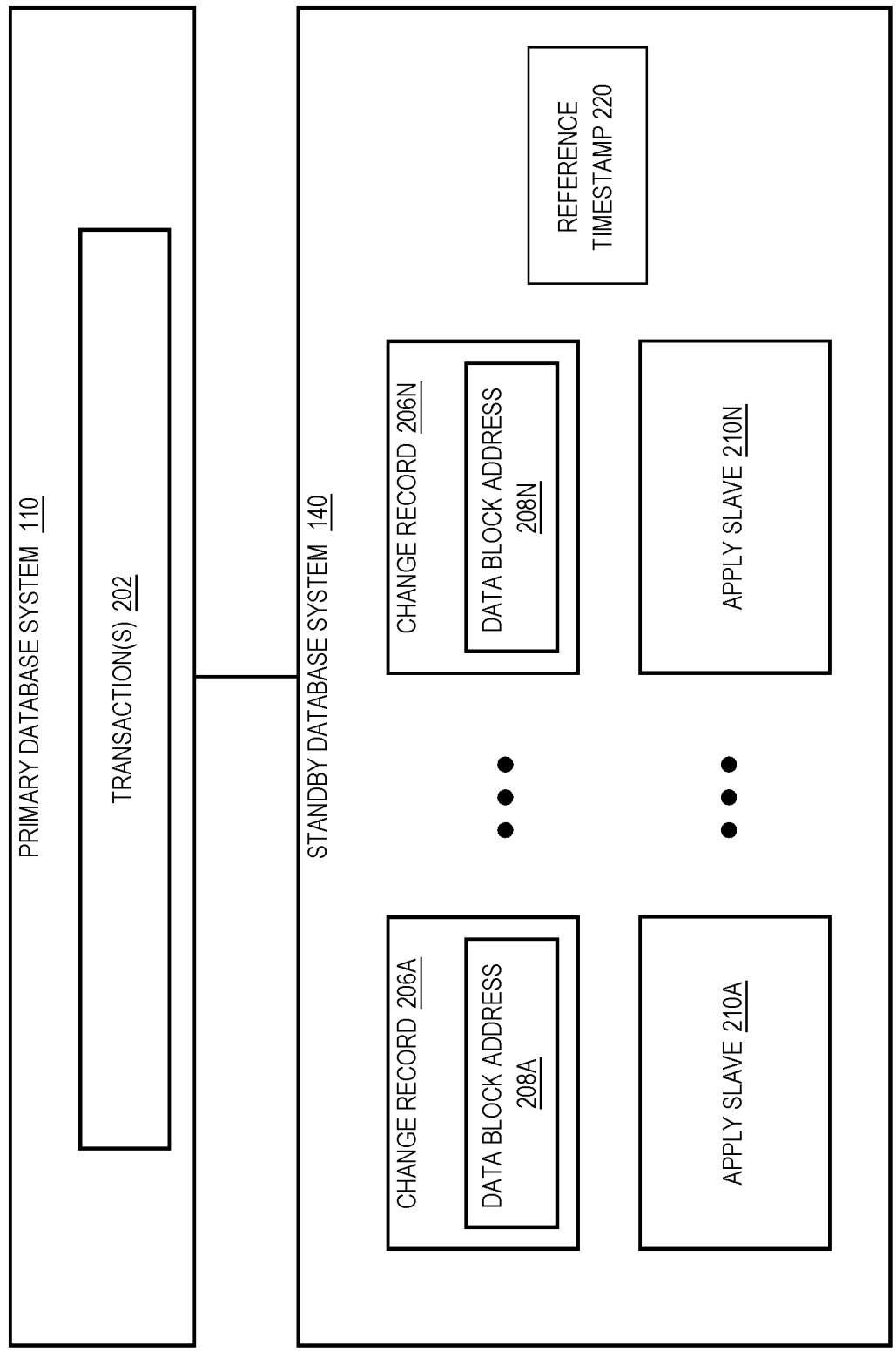
FIG. 2 is a block diagram that depicts an approach for maintaining consistency between multiple databases.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Embodiments allow a primary database system to automatically, and without manual intervention, detect queries (from both read-only and read-write transactions directed to the primary database) that may be offloaded to a standby, and then to automatically offload the detected queries to a target standby database system. Specifically, a standby database system maintains a standby database, which is separate from a primary database maintained by a corresponding primary database system, but which replicates data in the primary database.

According to one or more embodiments, the primary database system determines whether a given query is off-load-eligible, i.e., eligible to be offloaded to an available standby database system, based on a latest-commit object, which lists the latest-commit times of database objects and also indicates which database objects are up-to-date within each standby database system. According to embodiments, the latest-commit object may be any persisted or in-memory data structure, including a database table, a list, etc.

According to an embodiment, the primary database system maintains a latest-commit table that records the SCN at which changes to the database objects in the primary database commit. According to embodiments, the latest-commit table also includes a set of flags, for each database object, indicating whether the copy of the respective database object on each of the one or more standby database systems includes the latest changes made to the database object (i.e., the standby database object is "up-to-date"). Utilization of such a latest-commit table often allows the primary database system to offload an offload-eligible query in less time than would be required by waiting for the current SCN of the target standby database system to catch up to the query SCN of the query.

According to an embodiment, the primary database evaluates whether a query is offload-eligible based on detecting one or more trigger conditions that automatically trigger the evaluation. Example trigger conditions include detecting the presence of an offload optimizer hint in a query, determining that an expected run-time of a query is above a threshold, and determining that a query reads from a read-mostly database object. In this embodiment, the overhead of evaluating whether a query is offload-eligible is not incurred for every query. Trigger conditions are configured such that a query for which a trigger condition is detected is likely to be more effectively executed in a standby database system than in a primary database system.

The capability of the primary database system to automatically determine which queries are eligible to be offloaded to a standby database system eliminates the need for administrators to specifically determine which queries would be most effective to manually direct to a standby database system rather than to the primary database system. Such judgements are prone to error, which can cause inefficient utilization of primary and standby database system resources. Instead, according to embodiments, the primary database system is able to automatically identify offload-eligible queries to offload to a standby database system based, at least in part, on information about the current states of one or more standby database systems as well as the current state of the primary database system. Thus, automatic offloading of particular queries, in light of the current states of the primary and standby database systems, optimally utilizes the processing power of the primary and standby database systems.

Upon determining, based on the latest-commit table, that at least one standby database system is an offload candidate for a particular query over unmodified database objects, based on the at least one standby database system being up-to-date with respect to the database objects involved in the particular query, the primary database system automatically offloads the query to a target standby database system (i.e., one of the at least one offload candidate standby systems). The target standby database system runs the query over its standby database and returns the results of the query to the primary database system. In turn, the primary database system returns the results to the user. In this way, execution of the query at the standby database system is transparent to the user.

According to one or more embodiments, primary database system 110 determines whether to offload a query, in a read-write transaction, that reads from data that has been changed by a prior DML statement in the read-write transaction. In this case, any standby database system replicating the primary database is an offload candidate. Embodiments allow the query, running on a target standby database system, to access changes made to the changed data in the primary database. Specifically, embodiments cause session parameters of a session, running the offloaded query on the standby database system, to have the same values as corresponding session parameters of a session running the read-write transaction on the primary database system. These common session parameter values allow the offloaded query to access changes, made by the uncommitted read-write transaction, that have been propagated to the standby database.

Thus, evaluation of query offload eligibility is not restricted to queries that read from unmodified database objects. Resource-intensive queries, over database objects in the primary database that have uncommitted changes, may be offloaded to a standby database system and still return the same results as if the query had been run over the primary database. The ability to offload queries that read from database objects that have been changed in the primary database more evenly utilizes the processing power of available standby database systems, thereby increasing the efficiency of the primary and standby systems as a whole. Also, each offloaded query is completed more quickly on an individual basis than if the query had been run on an overloaded primary database system as originally directed.

According to embodiments, if only one standby database system is determined to be the offload candidate for a given query, the one standby database system is automatically identified as the target standby database system. However, if the primary database system determines that multiple standby databases are offload candidates for receiving offload of a given query, the primary database system identifies a target standby database system, among the multiple offload candidate databases, to which the query will be offloaded.

According to an embodiment, the primary database system bases identification of a target standby database system, from among multiple offload candidate standby database systems, on information about the multiple standby database systems, such as the current SCN of each system, performance statistics of each system, and/or the contents of one or more caches of each system. For example, the primary database system selects the target standby database system for a given query based on the target system being estimated to run the query in the shortest amount of time or being estimated to terminate running the query the soonest among the multiple offload candidates. Because the primary database system automatically selects the target standby system for a given query based on statistics of the offload candidates, the primary database system effectively preserves the workload balance among the multiple standby database systems and ensures that the given query is run as efficiently and quickly as possible.

Determining Whether to Evaluate a Query for Offload-Eligibility

FIG. 3 depicts a flowchart 300 for a primary database system automatically determining whether to offload a particular query, directed to the primary database, to a target standby database system, and then automatically redirecting the query to the target standby database system without manual intervention. Specifically, at step 302 of flowchart 300, a first database system maintains a primary database that includes a set of data. For example, primary database system 110 of FIG. 1 maintains primary database 132 that includes a particular set of data, such as an Employee table that stores, in rows and columns, information about the employees of a particular company.

Figure 4:
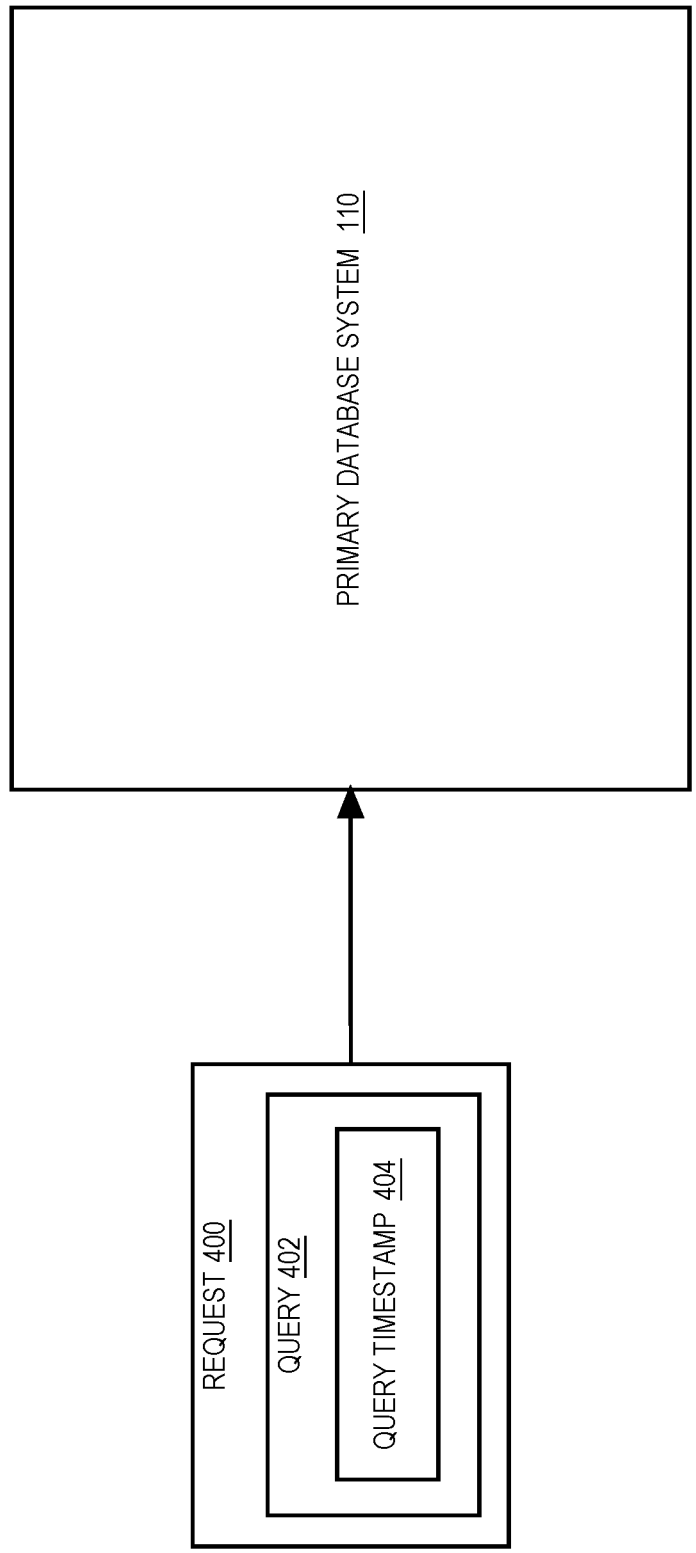
FIG. 4 depicts an example request to execute a query.

At step 304, a query over the set of data in the primary database is received at the first database system. For example, FIG. 4 depicts an example request to execute a query. To illustrate in the context of FIG. 4, an application initiates a connection with database server instance 122 (of primary database system 110) that maintains primary database 132. The application submits a request 400 to run a query 402, which reads from the Employee table in primary database 132, to database server instance 122 via the connection. Query 402 corresponds to query timestamp 404 as of which query 402 is to be executed. For example, query timestamp 404 is the SCN of primary database system 110 that represents a particular state of data in primary database 132 over which the query is to be executed. Furthermore, query 402 involves one or more database objects (i.e., the query runs over the one or more database objects) within primary database 132, each of which has been updated, within standby database 162, to a certain SCN of primary database 132. The SCN to which an object involved in a query is updated within standby database 162 generally runs behind the query SCN 404 of query 402, depending on the speed of applying change records to the standby database.

At step 306, the first database system automatically determines whether to automatically offload the query to a second database system that maintains a standby database that replicates the primary database. According to an embodiment, primary database system 110 evaluates every query for offload eligibility, i.e., where an offload-eligible query is determined to be ready to immediately offload to an available standby database system.

According to another embodiment, the determination of whether a received query is offload-eligible is triggered when primary database system 110 detects one or more trigger conditions for the query. Example trigger conditions include detecting the presence of an offload optimizer hint in a query, determining that an expected run-time of a query is above a threshold, and determining that a query reads from a read-mostly database object.

Trigger Condition: Offload Optimizer Hint

According to an embodiment, evaluation of the offload-eligibility of a query is triggered, at least in part, by an offload optimizer hint included in query 402. To illustrate, the following is an example of query 402 that includes an offload optimizer hint:

```
SELECT /*+ REDIRECT_TO_STANDBY */*
FROM Employee
WHERE department_id = 30;
```

According to one or more embodiments, inclusion of an offload optimizer hint in a query triggers primary database system 110 to evaluate whether to offload the query to a standby database, as described in further detail below.

Trigger Condition: Query Execution Time within Primary Database

According to an embodiment, primary database system 110 is triggered to evaluate whether to offload a query to a standby database in response to determining that an estimated run-time for the query within primary database 132 is over a pre-determined query run-time threshold.

For example, a query optimizer of primary database system 110 estimates the run-time of query 402 based on one or more optimizer statistics of primary database system 110, including one or more of: CPU level of computing device 120, amount of available volatile memory at computing device 120, latency of access to persistent storage 130 storing primary database 132, complexity of the query, information about the contents of a cache of the primary database system, the size of a target database object, in the primary database, of the query, etc.

According to an embodiment, the pre-determined query run-time threshold is a duration fixed by an administrator (i.e., a tunable parameter). According to another embodiment, the pre-determined query run-time threshold is a duration that is automatically identified by primary database system 110 based on performance statistics of primary database system 110.

Trigger Condition: Read-Mostly Object

According to an embodiment, primary database system 110 is triggered to evaluate whether to offload a query to a standby database in response to determining that the query involves a read-mostly object. A read-mostly object is a database object that is read far more than it is written to, for example, over a threshold percentage of read commands among all commands issued over the object. For example, primary database system 110 determines that an object involved in a particular query is a read-mostly object based on the optimizer statistics for the particular query. Also, a read-only database object is considered as a read-mostly object for purposes of embodiments. Using the fact that a query runs over a read-mostly object effectively utilizes system resources because the read-mostly object is very likely to be up to date in one or more standby databases given the infrequency of modification of the object.

Returning to an illustration of an embodiment of step 306 of flowchart 300 that accounts for trigger conditions, when query 402 is received at primary database system 110, system 110 determines, from optimizer statistics for the query, that the expected run-time of the query is over a threshold amount of time. In response to identifying this trigger condition, primary database system evaluates whether query 402 is offload-eligible.

Determining Whether to Offload a Query Based on a Latest-Commit Table for Primary Database Objects Once primary database system 110 identifies one or more trigger conditions for query 402, primary database system 110 determines whether to offload the query to a standby database system, such as standby database system 140, or in other words, system 110 determines whether query 402 is offload-eligible. Specifically, returning to a discussion of step 306 of flowchart 300, according to one or more embodiments, the primary database system 110 automatically determines whether to offload query 402 (issued over primary database 132) to standby database system 140 based, at least in part, on a latest-commit table maintained by primary database system 110.

Flowchart 300 of FIG. 3 is described herein in the context of query 402 running only over database objects that have not been modified by any DML statement in the transaction containing query 402. Other embodiments are described below where query 402 runs over one or more database objects that have been modified by one or more previous DML statements in the transaction containing query 402. Furthermore, flowchart 300 of FIG. 3 is described herein in the context of standby database systems maintaining physical replicas of the primary database. Also, while embodiments are described in the context of a latest-commit table, the latest-commit information may be stored within primary database system 110 in any format and, according to one or more embodiments, is not limited to a table format.

Maintaining the Latest-Commit Table

According to embodiments, primary database system 110 maintains a latest-commit table that lists identifiers of database objects from primary database 132 with their latest-commit SCNs within primary database system 110. The latest-commit table also includes information about the status of the respective database objects within the one or more standby database systems of primary database system 110 (which include standby database system 140). According to one or more embodiments, primary database system 110 maintains such a latest-commit database object in a dictionary of primary database 132 and/or in volatile memory of computing device 120.

To illustrate, FIGS. 5A-5C depict a latest-commit table 500, which, according to one or more embodiments, primary database system 110 creates and maintains for purposes of determining whether to offload a given query. Latest-commit table 500 includes flags for each database object within primary database 132 listed in table 500 for each respective standby database system that replicates primary database 132. In the example of latest-commit table 500 of FIG. 5A, three standby database systems (represented by columns 520, 530, and 540) replicate primary database 132.

For purposes of clarity, the labels of columns 520, 530, and 540 include the current SCNs of each respective standby database in parenthesis. Specifically, as depicted in FIG. 5A, standby database 1 has a current SCN of 210, standby database 2 has a current SCN of 200, and standby database 3 has a current SCN of 170. To explain an example row in table 500 of FIG. 5A, the latest-commit SCN for an Employees table is 190, and standby databases 1 and 2 (with current SCNs of 210 and 200, respectively) are up-to-date with respect to the Employees table. Standby database 3, which has a current SCN of 170, is not up-to-date with respect to the Employees table.

To maintain latest-commit table 500, primary database system 110 records, in response to a transaction committing within primary database 132 and for each database object updated or created by the transaction, the commit SCN of the transaction as depicted in column 510 of latest-commit table 500. For example, while latest-commit table 500 was in a state previous to the state depicted in FIG. 5A, a particular transaction that updates the Employees table and an SSN table within primary database 132 commits at SCN 190. In response to the particular transaction committing, primary database system 110 updates the commit SCN of the Employees table and the SSN table, as shown in column 510 of latest-commit table 500 depicted in FIG. 5A, to the commit SCN of the transaction (i.e., 190).

Each standby database system of primary database system 110 sends heartbeat messages to primary database system 110. A heartbeat message is an automatically-generated message, sent periodically to a primary database system from a standby database maintaining a replica of the primary database, that includes statistics indicating the current state of the standby system. A heartbeat message includes the current SCN of the standby database system that originated the message.

Upon receiving a heartbeat message from a given standby database system, primary database system 110 updates latest-commit table 500 based on the current SCN of the given standby database system. Specifically, primary database system 110 sets any flags, for the given standby database system, associated with database objects that have a commit SCN that is at most the current SCN of the given standby database system. In this way, latest-commit table 500 tracks the database objects, within each standby database replicating primary database 132, that are up-to-date with respect to the corresponding database object within primary database 132.

To illustrate, when latest-commit table 500 is as depicted in FIG. 5A, a transaction that updated the Employees table and the SSN table commits at SCN 220 within primary database 132. In response to the transaction committing, primary database system 110 updates latest-commit table 500 to reflect the latest-commit time (SCN 220) for the Employees table and the SSN table as depicted in column 510 in FIG. 5B. Also, primary database system 110 clears all flags for the Employees table and the SSN table within table 500 to reflect that none of the standby databases are up-to-date with the changes made by the transaction (since none of the standby databases have been updated to SCN 220).

To further illustrate, when latest-commit table 500 is as depicted in FIG. 5B, primary database system 110 receives a heartbeat message from standby database system 3, which indicates that the current SCN of standby database 3 is 220. In response to receiving this message, primary database system 110 updates latest-commit table 500, as depicted in FIG. 5C, to update the flags in column 540 for standby database 3 to set all flags for database objects that are less than or equal to the current SCN for standby database 3. Since all depicted database objects, other than the Times table, have a commit SCN of 220 or less, primary database system 110 sets all flags in column 540 other than the unset flag for the Times table. In this way, latest-commit table 500 tracks how up-to-date each standby database is on an object-by-object level.

Using the Latest-Commit Table to Determine Whether to Offload a Query

The following is an illustration of primary database system 110 automatically determining whether to offload query 402 (issued over primary database 132) to standby database system 140 based, at least in part, on latest-commit table 500, as depicted in FIG. 5A. Specifically, primary database system 110 receives query 402, which reads from the Employees table and the Jobs table in primary database 132, at SCN 250 while the latest-commit table 500 is in the state depicted in FIG. 5A.

In response to receiving query 402, primary database system 110 looks for at least one trigger condition for query 402 to trigger a determination of whether the query is offload-eligible. According to this example, query 402 includes an offload optimizer hint and, as such, primary database system 110 proceeds with determining whether query 402 is offload-eligible by determining whether any of the standby database systems that replicate primary database 132 are up-to-date with respect to the database objects of query 402. In FIG. 5A, latest-commit table 500 indicates that only standby database 1 is up-to-date for both the Employees table and the Jobs table. Thus, primary database system 110 determines that query 402 is eligible to be offloaded to standby database 1 (e.g., maintained by standby database system 140), where standby database 1 is the "target" standby database for query 402.

As a further example, a particular query, for which offload-eligibility analysis has been triggered, operates only over a Times table, which is a read-mostly table in primary database 132, and which is not up-to-date in any standby database replicating primary database 132. According to an embodiment, because there is no standby database that is up-to-date for all of the database objects involved in the particular query, primary database system 110 automatically runs the query over primary database 132 without offloading the query to a standby database system.

Delayed Query Offload

According to another embodiment, when primary database system 110 determines that there is no standby database that is up-to-date for all of the database objects involved in a particular offload-eligible query, primary database system 110 determines whether to delay offloading the particular query until at least one standby system comes up-to-date for all of the database objects involved in the particular query based on detecting one or more conditions indicating that delay is warranted.

For example, a condition indicating that delay is warranted comprises primary database system 110 detecting that an expected run-time for the query is over a threshold amount of run-time. If a given offload-eligible query would run for a long time on primary database 132 in the absence of an up-to-date standby, performing a delayed offload of the query is beneficial to make sure that primary database system 110 is not required to dedicate a large amount of resource bandwidth to a single query. In this example, all standby database systems that replicate primary database 132 are considered to be offload candidates for the given query.

As a further example of a condition indicating that delayed offload of a given offload-eligible query is warranted, primary database system 110 determines that at least one standby database system is within a threshold amount of lag time from being up-to-date on all of the database objects involved in the given offload-eligible query. To illustrate, the threshold amount of lag time is 10 SCNs, and the last heartbeat message of a given standby database system indicates that the current SCN of the standby database system is within 10 SCN of the latest-commit SCN of the latest-committed database object involved in the query (as indicated in latest-commit table 500). In this case, any standby database system within the threshold amount of lag time is considered to be an offload candidate for the given query.

According to an embodiment, upon determining to delay a particular query, primary database system 110 registers the delayed query in a list of delayed queries and also makes a copy of latest-commit table 500 with the latest-commit SCNs of the objects involved in the delayed query as of the time that the query was received. This copy of the latest-commit table includes a respective column for each standby database system that is an offload candidate for the particular delayed query. All copies of the latest-commit table associated with delayed queries are updated, as described in connection with the main copy of latest-commit table 500 above, based on information from heartbeat messages from standby database systems included in the respective copies.

Primary database system 110 determines that a given delayed query, in the list, is offload-eligible upon detecting that a target standby database system in the associated copy of the latest-commit table has become up-to-date for all database objects involved in the query with respect to the SCNs listed in the copy of the table (which were recorded in table 500 at the SCN of the query). A query that has been subject to a delayed offload operation is offloaded, to the target standby database system, upon the target standby database becoming up-to-date with respect to all database objects involved in the delayed query. Delaying a query in a transaction that includes one or more statements after the query also delays the subsequent statements until completion of the query.

Identifying a Target Standby Database System, from Multiple Candidate Standby Systems, for Query Offload Once primary database system 110 determines that query 402 is eligible for automatic offloading to a standby database system. In the case where multiple standby databases are offload candidates for query 402, primary database system 110 automatically identifies a target standby database system, among the multiple offload candidates, to which primary database system 110 will offload the query. Specifically, primary database system 110 identifies a target standby database to run the offload-eligible query based on which candidate standby database system has the shortest estimated run-time for the query and/or has the earliest estimated termination time for executing the query.

Many aspects may inform the estimated run-time or estimated termination time for a query within a given standby database system. Regarding the information about the contents of the cache of a standby database system, when a database system executes a query, if the query results are present in a cache maintained by the standby system, the system returns the cached result without re-executing the query, which expedites execution of the query. Furthermore, the presence of an index in a given standby database system that may be included in the execution plan for a query generated by the system may expedite execution of the query in that system.

According to an embodiment, primary database system 110 retrieves the estimated run-time and estimated termination time for a query by submitting the query to the candidate standby database systems with a request to evaluate the query without running the query, where each candidate standby database system returns the estimated run-time and estimated termination time for the query to system 110.

To illustrate, primary database system 110 determines that both of standby database system 140 and another standby database system that maintains a replica of primary database 132 are offload candidates for a given query. Primary database system 110 selects standby database system 140 to be the target standby database system for the given query based on one of the following example circumstances:

Standby database system 140 has a shorter estimated run-time than the second standby database system for the given query and is estimated to complete the given query sooner than the second standby database system.

Standby database system 140 is estimated to complete the given query sooner than the second standby database system despite the second standby database system having a shorter estimated run-time for the given query.

Standby database system 140 has a shorter estimated run-time than the second standby database system for the given query despite the second standby database system being estimated to complete the given query sooner than standby database system 140.

Automatically Offloading the Query to the Target Standby Database System

At step 308, in response to determining to offload the query to the second database system, the first database system automatically offloads the query by submitting, to the second database system, a request to run the query over a copy of the set of data in the standby database. For example, primary database system 110 determines that query 402 is offload-eligible and identifies standby database system 140 as the target standby database system for query 402. When the standby database system 140 is up-to-date for all database objects involved in query 402, primary database system 110 submits, to standby database system 140, a request modeled after request 400 to run query 402 over standby database 162.

According to an embodiment, primary database system 110 initiates and/or maintains a database link to standby database system 140. Standby database system 140 maintains a session for the connection with primary database system 110. Thus, to submit query 402 to standby database system 140, primary database system 110 submits the request to execute the query over the database link. When standby database system 140 receives the request to execute query 402 over the database link, standby database system 140 runs the query in the session associated with the database link.

According to an embodiment, primary database system 110 sends, to standby database system 140, a timestamp indicating a state of the database over which query 402 is to be run. For example system 110 sets one or more session parameters, within the session maintained in system 140 for connection with primary database system 110, to indicate a flashback state of the database for the most advanced SCN of all latest-commit SCNs of objects involved in query 140. Standby database system 140 runs query 402 over the state of standby database 162 that corresponds to the flashback state SCN in the session parameters of the session running query 402.

At step 310, results of the query are received from the second database system. For example, in response to receiving the request to run query 402, standby database system 140 retrieves data, from standby database 162, that satisfies the query. Upon completing execution of query 402, standby database system 140 returns the query results to primary database system 110, e.g., over the database link. Primary database system 110 receives the results from standby database system 140, and, as such, does not run query 402 itself.

At step 312, the first database system returns, to the user as results of the query, the query results received from the standby database. For example, primary database system 110 returns, to the application that initiated request 400 and via a session set up for that application on primary database system 110, results of query 402 received from standby database system 140. Thus, primary database system 110 offloading query 402 to standby database system 140 is transparent to the user.

Offloading a Query that Runs Over at Least One Database Object that Includes Uncommitted Changes According to one or more embodiments, primary database system 110 determines to offload a query, to standby database system 140, where the query is part of a read-write transaction that has made one or more uncommitted changes to a data set, in primary database 132, over which the query runs. For example, primary database system 110 determines to offload a query from a read-write transaction based on detecting at least one of the trigger conditions described in detail above.

Figure 6:
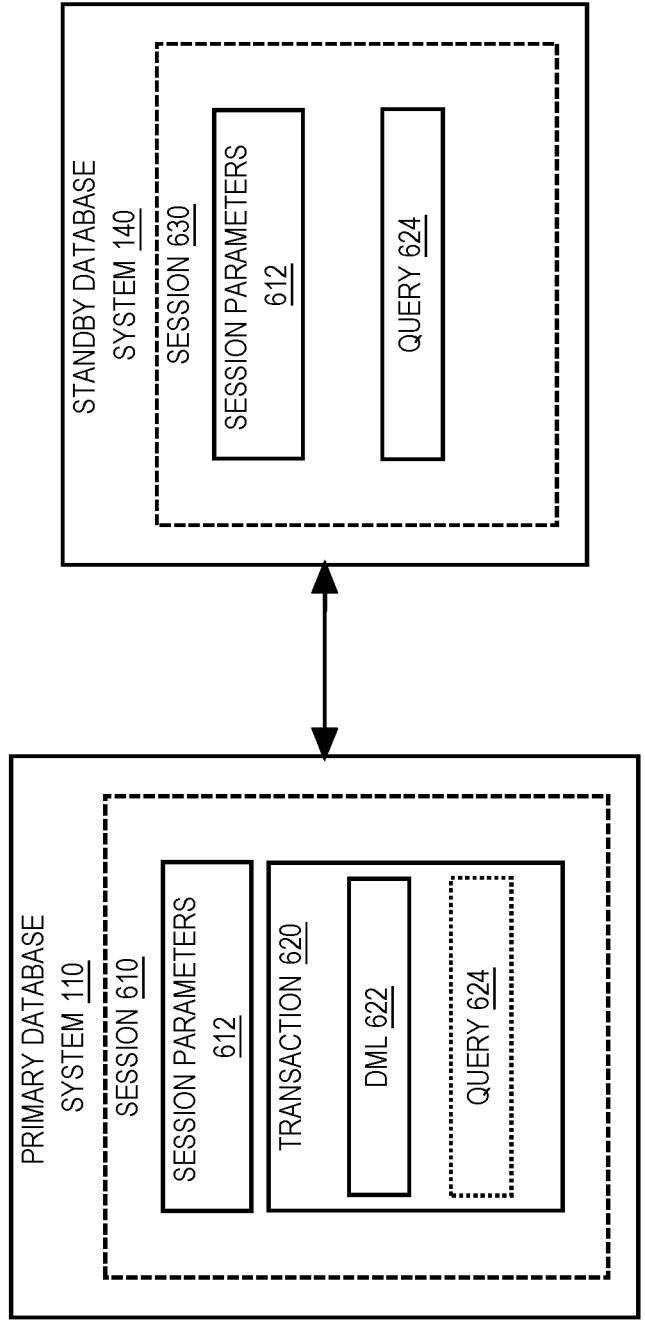
FIG. 6 depicts sessions, run by a primary database system and a standby database system, respectively, having one or more of the same session parameters.

Based on ACID properties of transactions within a database system, the changes made to the data set are not visible in any session, other than the session running the transaction, until the transaction commits. For example, as depicted in FIG. 6, a transaction 620 includes at least one DML statement 622 that changes data in the Employee table in primary database 132. Transaction 620 further includes a query 624, which runs after DML statement 622, and which reads from the Employees table as modified by DML statement 622.

As uncommitted changes are made by transaction 620 to primary database 132, primary database system 110 sends change records that communicate those changes to standby database system 140 with the associated SCNs. In time, standby database system 140 applies the uncommitted changes to standby database 162 (where the uncommitted changes are committed in standby database 162 only upon receiving a change record that indicates that the transaction has committed). The current SCN of standby database 162 reflects these uncommitted changes because the changes have associated SCNs.

According to one or more embodiments, primary database system 110 determines to offload query 624 based on latest-commit table 500, which tracks the latest SCN of each standby database system. Specifically, (as with a query that runs only over database objects with no uncommitted changes) system 110 determines whether query 624 is offload-eligible based on whether database objects involved in query 624 are up-to-date. For each database object involved in query 624 that has not been modified by a previous DML statement, system 110 determines whether the object is up-to-date based on table 500 as described in detail above.

According to an embodiment, for each database object involved in query 624 that has been modified by a previous DML statement, primary database system 110 determines whether a respective modified object is up-to-date in a given standby database based on whether the standby database has reached at least the SCN of the latest DML statement in transaction 620 that modified the respective object. According to another embodiment, system 110 determines whether an object involved in query 624 that has been modified by a prior DML statement is up-to-date in a given standby database by comparing the current SCN of the standby database with the SCN of the latest DML statement in transaction 620 that made any changes to an object involved in query 624.

Continuing with the above example illustration, primary database system 110 selects standby database system 140 as the target standby database system for query 624 based on standby database system 140 being up-to-date for the database objects involved in query 624. In order to ensure that the results of running query 624 over standby database 162 are the same as would be retrieved if query 624 were run over primary database 132, query 624 running on standby database system 140 should have access to any uncommitted changes made by transaction 620 prior to query 624.

On primary database system 110, transaction 620 runs within a session 610, which has at least a set of session parameters 612 including both transaction identification information and session information. Specifically, session parameters 612 include one or more of: an identifier of transaction 620, an undo block address of transaction 620, and an SCN at which transaction 620 initiated within primary database system 110, etc.

Prior to offloading query 624 to standby database system 140, primary database system 110 establishes a new session 630 on standby database system 140. According to an embodiment, primary database system 110 establishes session 630, without explicitly establishing a database link, using the user information and credentials for session 610 that have been propagated to standby database system 140 by virtue of standby database system 140 maintaining a physical replica of primary database 132.

Because session 630 is established by primary database system 110, and not by an application, primary database system 110 may set the session parameters of session 630 as needed. Thus, primary database system 110 populates new session 630 on standby database system 140 with the same user credentials and information as was used for session 610, as well as the same values for session parameters 612, which include transaction identification information. For example, primary database system 110 communicates, with standby database system 140, via a previously-established connection and using an RPC, to set values of session parameters 612 of session 630 to be the values of the corresponding session parameters of session 610.

Because target standby database system 140 is up-to-date for query 624, all uncommitted changes made by transaction 620 (prior to the query SCN, such as changes made by DML 622) have been applied to standby database 162. Because session 630, on standby database system 140, that runs query 624 has the same values for session parameters 612 as session 610 that runs transaction 620 on primary database system 110, query 624 has access to the same uncommitted changes in standby database 162 as the query would have if it were running over primary database 132. Specifically, because session 630 has the same values for session parameters 612 as session 610, query 624 that runs within session 630 has the same enabling rules and the same privileges as transaction 620 running in session 610.

In this way, session 630 on standby database system 140 becomes a proxy session for session 610, given that any database command run within session 630 has access to the same uncommitted changes that the command would be able to access if the command were run in session 610.

Query Offload to Logical Standby Database

Embodiments are described above in the context of standby database 162 being a physical replica of primary database 132, where standby database system 140 replicates primary database 132 by applying, to standby database 162, change records received from primary database system 110, which record changes made to the data in primary database 132. However, according to one or more embodiments, standby database 162 is a logical replica of primary database 132, where standby database system 140 replicates primary database 132 by performing the same database commands, over standby database 162, as primary database system 110 performs over primary database 132. A logical standby database system maintains a unique SCN, which prevents primary database system 110 from comparing its own SCNs with those of a logical standby database to determine whether and when to offload a given query.

According to an embodiment, primary database system 110 determines whether to offload a query that is part of a read-only transaction to a logical standby database system based on versions of database objects in the primary and logical standby databases. In such embodiments, both primary database system 110 and the logical standby database system record version identifiers for database objects, where the same version number for a database object across the two systems indicate the same committed state of the object. Thus, in order to determine whether and when to offload the query to the logical standby database system, primary database system 110 inspects the versions of target objects, for the query, that are maintained in the logical standby database to determine whether the object versions in the standby are the versions expected for the given query. Primary database system 110 offloads the query to the logical standby database system only if the versions of the target objects of the query are the same versions of the objects at the query SCN in primary database 132.

According to another embodiment, a watermark SCN is determined for each logical standby database that logically replicates primary database 132. The watermark SCN for a given logical standby is the SCN (relative to primary database system 110) at which the logical standby database is consistent with primary database 132.

For example, each time that a logical standby database system successfully commits a given transaction, the logical standby database system reports, to primary database system 110 (e.g., via a heartbeat message), an identifier of the transaction, which confirms the committed status of the transaction within the logical standby database. Primary database system 110 tracks the SCN of primary database 132 at which each transaction commits on primary database system 110. Primary database system 110 determines the watermark SCN of the logical standby database to be the latest SCN, of primary database 132, at which all transactions committed within primary database 132 have been committed in the logical standby database.

According to another example, each logical standby database system maintains a watermark SCN for itself, which the logical standby database system provides in a heartbeat message to primary system 110. Specifically, primary database system 110 sends, to each logical standby database system, SCNs at which given transactions commit. A logical standby database stores a record of the commit SCN of each transaction. Periodically, the logical standby database sends, to primary database system 110, a heartbeat message that includes the latest SCN that indicates the last contiguous transaction committed by the logical standby database system. As a simple example, a logical standby database system has received information that primary database system 110 has committed each of the following transactions at the associated SCNs: T1-T12. At the time of a given heartbeat message, the logical standby database system has committed T1-T9 and T11. As such, the given heartbeat message includes the SCN "9" as the watermark SCN because that is the latest SCN at which the primary database and the logical standby database had the same state.

Primary database system 110 uses the watermark SCNs sent by the logical standby database systems to update latest-commit table 500 in the same way described above for physical standby database systems. Thus, queries that run over unmodified database objects received at primary database system 110 may be offloaded to a logical standby database system in the same way that such queries are offloaded to a physical standby database system. However, because logical standby database systems are not associated with watermark SCNs that indicate whether uncommitted changes have been applied to database objects within the logical standby databases, queries over database objects that include uncommitted changes are not offloaded to logical standby database systems. As such, queries that are offloaded to a logical standby database will result in the same set of data as queries executed over the primary database.

Change Records and Data Blocks

As mentioned above, change records 206A-N specify one or more changes made by transaction(s) 202 performed against primary database 132. Primary database system 110 streams change records 206A-N to one or more standby database systems that physically replicate primary database 132, including standby database system 140. In some example embodiments, change records 206A-N may include data block addresses 208A-N. A data block is an atomic unit of data that a database server may request to read from and write to with regard to a storage device that stores table data, e.g., in a block-mode disk storage device. To illustrate, in order to retrieve a row from a storage device, a data block containing the row is read into a cache (such as a cache residing in volatile memory of computing device 120 or one of computing devices 150A-N of FIG. 1) and the cached copy of the data block stored is examined to access the row.

A data block is used by a DBMS to store one or more database rows, or portions of rows, including one or more columns of a row. When rows are read from persistent storage, a data block containing the row is copied into a data block buffer in RAM and/or main memory of a database server. A data block may correspond to a predetermined number of bytes of physical storage space, and is referred to as atomic because it is generally the smallest unit of database data that a database server may request from a persistent storage device. For example, a DBMS may store data in data blocks that each correspond to two kilobytes of disk space. When a database server seeks a row that is stored in a data block, the data block may only read the row from a persistent storage device by reading in the entire data block.

Each change record includes a data block address that may indicate a location of a particular data block in primary database system 110 and/or standby database system 140. The location may be a relative location of the particular data block at which a change occurred in the primary database. Since the standby database is a replica of the primary database, the location may also be a relative location of the particular data block at which a change is to occur in the standby database.

In some example embodiments described below, standby database system 140 includes apply slaves 210A-N that apply changes indicated in change records 206A-N to corresponding data blocks in the standby database. Standby database system 140 may allocate change records 206A-N among apply slaves 210A-N based on data block addresses 208A-N. For example, apply slave 210A is allocated any change records to be applied in the data block address range of 100 to 500, and apply slave 210B is allocated any change records to be applied in the data block address range of 501 to 700. In some example embodiments described below, change records 206A-N may be allocated among apply slaves 210A-N based on a hash of data block addresses 208A-N.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines the totality of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/WL is a common extension of SQL used when manipulating XML data in an object-relational database.

A single-node database system, such as system 110, comprises a single node that runs a database server instance that accesses and manages the database. A multi-node database management system, such as system 140, is made up of interconnected nodes that share access to the same database. Typically, the nodes are interconnected via a network and share access, in varying degrees, to shared storage, e.g. shared access to a set of disk drives and data blocks stored thereon represented, in FIG. 1, as persistent storage 160. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Query Optimization

As used herein, a query is considered "transformed" when the query is (a) rewritten from a first expression or representation to a second expression or representation, (b) received in a manner that specifies or indicates a first set of operations, such as a first expression, representation, or execution plan, and executed using a second set of operations, such as the operations specified by or indicated by a second expression, representation, or execution plan, or (c) received in a manner that specifies or indicates a first set of operations, and planned for execution using a second set of operations.

Two queries or execution plans are semantically equivalent to each other when the two queries or execution plans, if executed, would produce equivalent result sets, even if the result sets are assembled in different manners by the two queries or execution plans. Execution of a query is semantically equivalent to a query or execution plan if the query execution produces a result set that is equivalent to the one that would be produced by that query or execution plan, if executed.

A query optimizer may optimize a query by transforming the query. In general, transforming a query involves rewriting a query into another query that produces the same result and that can potentially be executed more efficiently, i.e., one for which a potentially more efficient and/or less costly execution plan can be generated. A query may be rewritten by manipulating any internal representation of the query, including any copy thereof, to form a transformed query or a transformed query representation. Alternatively and/or in addition, a query may be rewritten by generating a different but semantically equivalent database statement. According to embodiments, the query optimizer of primary database system 110 determines to offload a query to standby database system 140 based on determining that an execution plan involving offloading the query is estimated to be more efficient than an alternative execution plan that does not involve offloading the query to system 140, but runs the query over primary database 132.

Alternatives or Extensions

One or more of the functions attributed to any process described herein, according to one or more embodiments, may be performed any other logical or physical entity, according to one or more embodiments. In an embodiment, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
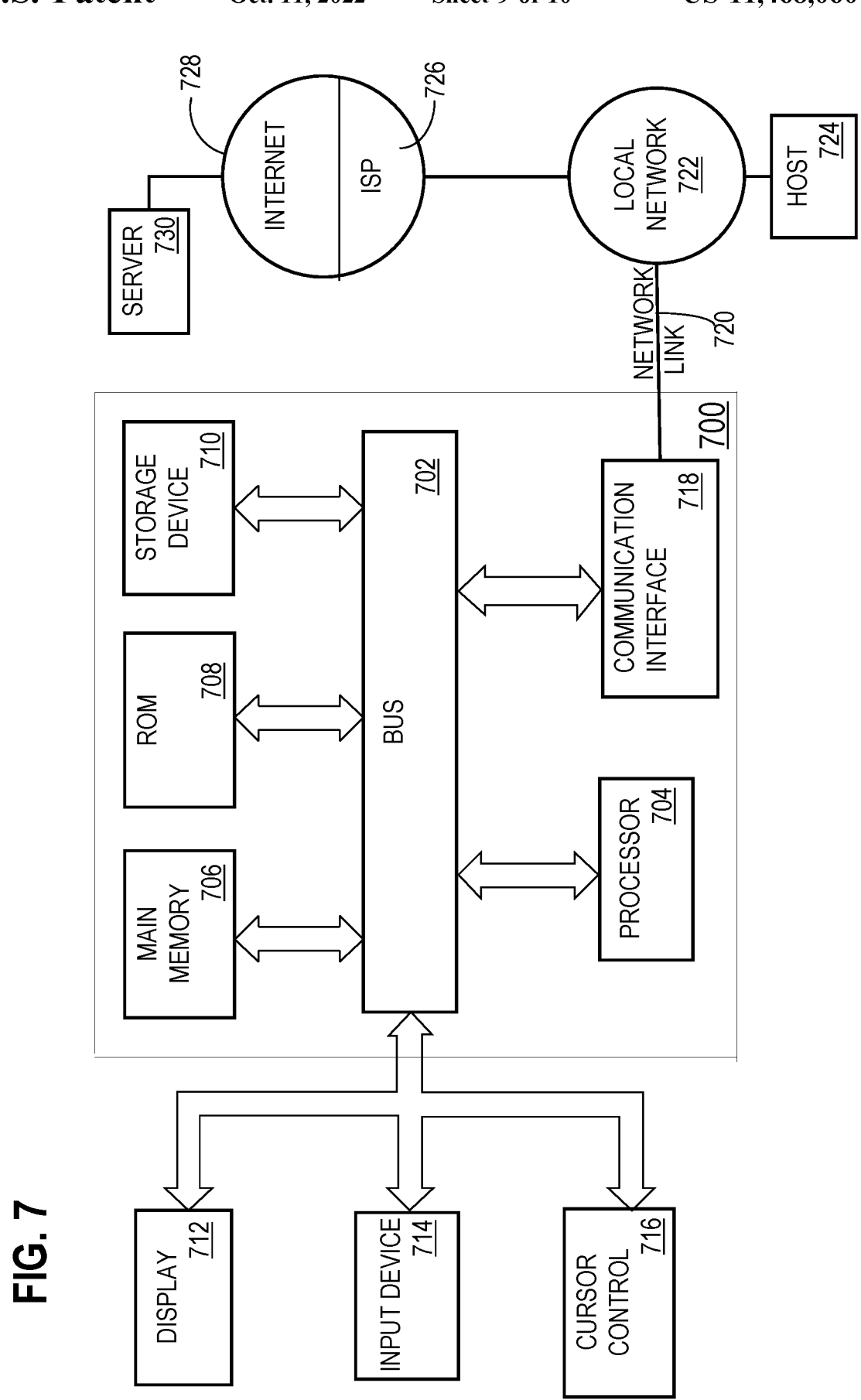
FIG. 7 is a block diagram of a computer system on which embodiments may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

FIG. 8 is a block diagram of a basic software system 800 that may be employed for controlling the operation of computer system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computer system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   a first database system maintaining a primary database that includes a set of data;

receiving, at the first database system, a query over one or more query database objects in the set of data in the primary database;

the first database system automatically determining whether to offload the query to a second database system that maintains a standby database that replicates the primary database;

wherein the standby database includes one or more query database object copies of the one or more query database objects in the primary database;

the first database system maintaining object-specific standby information comprising, for each query database object of the one or more query database objects, object-specific information indicating whether a query database object copy of said each query database object in the standby database is up-to-date;

wherein said determining whether to offload the query to the second database system is based on whether the one or more query database object copies are indicated as up-to-date in the object-specific standby information;

in response to determining to offload the query to the second database system, the first database system automatically offloading the query by submitting, to the second database system, a request to run the query over a copy of the set of data in the standby database;

receiving, from the second database system, results of the query; and the first database system returning, as results of the query, the query results received from the second database system.

2. The method of claim 1, further comprising:

the first database system detecting, at a particular timestamp, a commit of a transaction over the primary database;

wherein the transaction modified one or more particular database objects in the primary database;

in response to detecting the commit of the transaction over the primary database:

adjusting information for each database object of the one or more particular database objects, in the object-specific standby information, to reflect the particular timestamp to produce updated object-specific standby information;

wherein the first database system automatically determining whether to offload the query to the second database system is based on the updated object-specific standby information.

3. The method of claim 2, further comprising:

the first database system receiving, from the second database system, a message that indicates a current timestamp of the second database system;

in response to receiving the message, the first database system automatically setting each of a set of one or more flags within the object-specific standby information;

wherein each flag of the set of one or more flags is associated with a database object in the set of data that is associated, in the object-specific standby information, with a commit timestamp that is no greater than the current timestamp of the second database system.

4. The method of claim 3, wherein the first database system automatically determining whether to offload the query to the second database system comprises:

determining whether one or more particular flags, of the set of one or more flags within the object-specific standby information, the one or more particular flags being associated with the one or more query database objects, are set;

in response to determining that the one or more particular flags are set within the object-specific standby information, automatically identifying the query as offload-eligible.

5. The method of claim 3, wherein:

the first database system automatically determining whether to offload the query to the second database system comprises:

determining whether one or more particular flags, of the set of one or more flags within the object-specific standby information, the one or more particular flags being associated with the one or more query database objects, are set;

in response to determining that at least one flag, of the one or more particular flags, is not set within the object-specific standby information, automatically determining to perform a delayed offload of the query to the second database system based, at least in part, on determining one or more of:

a first database system run-time of the query is estimated to be over a threshold amount of run-time, or the current timestamp of the second database system is within a threshold amount of lag time from a most-recent commit timestamp associated with the one or more query database objects within the object-specific standby information;

automatically identifying the query as offload-eligible once the current timestamp of the second database system reaches the most-recent commit timestamp associated with the one or more query database objects within the object-specific standby information;

the first database system automatically offloads the query in response to determining that the current timestamp of the second database system has reached the most-recent commit timestamp associated with the one or more query database objects within the object-specific standby information.

6. The method of claim 3, further comprising:

receiving, at the first database system, a second query over a set of query database objects in the set of data in the primary database;

wherein the object-specific standby information includes a standby database system-specific set of flags for each standby database system of one or more standby database systems that include the second database system;

the first database system automatically determining whether to offload the second query to the one or more standby database systems based, at least in part, on the object-specific standby information comprising, for each standby database system of the one or more standby database systems:

determining that one or more flags, of the standby database system-specific set of flags for said each standby database system, associated with one or more database objects of the set of query database objects, are not set within the object-specific standby information;

in response to determining that each standby database system, of the one or more standby database systems, is associated with one or more unset flags associated with one or more database objects of the set of query database objects within the object-specific standby information, automatically running the second query over the primary database.

7. The method of claim 3, wherein the message that indicates the current timestamp of the second database system is a heartbeat message from the second database system.

8. The method of claim 2, further comprising: in response to detecting the commit of the transaction over the primary database: unsetting any flags, within the object-specific standby information, that are associated with the one or more particular database objects.

9. The method of claim 1, further comprising:
the first database system detecting at least one condition of one or more conditions that trigger evaluation of offload-eligibility of the query, wherein the one or more conditions comprise:
the presence of an offload optimizer hint in the query, identification of one or more read-mostly objects in the query, and
a run-time of the query is estimated to be over a threshold amount of run-time;
wherein the first database system automatically determining whether to offload the query is performed in response to the first database system detecting at least one condition of the one or more conditions.

10. The method of claim 1, wherein:
the standby database is a physical replica of the primary database;
the query is part of a transaction initiated on the first database system;
the transaction includes one or more data manipulation language (DML) operations configured to make one or more changes to the set of data prior to the query; and
the method further comprises:
prior to automatically submitting, to the second database system, the request to run the query over the copy of the set of data in the standby database, the transaction performing the one or more DML operations, which make the one or more changes to the set of data, to produce an adjusted set of data in the primary database;
wherein the query is configured to run over the adjusted set of data;
wherein automatically submitting, to the second database system, the request to run the query over the copy of the set of data in the standby database is performed prior to the transaction committing.

11. The method of claim 10, further comprising, prior to the transaction committing and after the transaction performing the one or more DML operations that make the one or more changes to the set of data:
the first database system sending one or more change records, to the second database system, that reflect the one or more changes to the set of data in the primary database;
wherein the second database system applies the one or more change records to the copy of the set of data in the standby database to produce an adjusted copy of the set of data in the standby database;
wherein the results of the query, received from the second database system, are based on the adjusted copy of the set of data in the standby database.

12. The method of claim 11, further comprising:
the first database system automatically establishing a first session on the second database system;
causing one or more session parameters, of the first session, to have values of one or more corresponding session parameters of a second session, on the first database system, that runs the transaction;
the second database system running the query, within the first session, over the adjusted copy of the set of data based, at least in part, on the one or more session parameters, of the first session, having the values of the one or more corresponding session parameters of the second session.

13. The method of claim 1, further including, before the first database system automatically determining whether to offload the query to a second database system:
based on the object-specific information, the first database system determining that at least one of the one or more query database objects is not up-to-date; and
in response to the first database system determining that at least one of the one or more query database objects is not up-to-date, determining to perform a delayed offload of the query.

14. One or more non-transitory computer-readable media storing one or more sequences of instructions that, when executed by one or more processors, cause:
a first database system maintaining a primary database that includes a set of data;
receiving, at the first database system, a query over one or more query database objects in the set of data in the primary database;
the first database system automatically determining whether to offload the query to a second database system that maintains a standby database that replicates the primary database;
wherein the standby database includes one or more query database object copies of the one or more query database objects in the primary database;
the first database system maintaining object-specific standby information comprising, for each query database object of the one or more query database objects, object-specific information indicating whether a query database object copy of said each query database object in the standby database is up-to-date;
wherein said determining whether to offload the query to the second database system is based on whether the one or more query database object copies are indicated as up-to-date in the object-specific standby information;
in response to determining to offload the query to the second database system, the first database system automatically offloading the query by submitting, to the second database system, a request to run the query over a copy of the set of data in the standby database;
receiving, from the second database system, results of the query; and
the first database system returning, as results of the query, the query results received from the second database system.

15. The one or more non-transitory computer-readable claim 14, wherein the one or more sequences of instructions further comprise instructions that, when executed by one or more processors, cause:
the first database system detecting, at a particular timestamp, a commit of a transaction over the primary database;
wherein the transaction modified one or more particular database objects in the primary database;
in response to detecting the commit of the transaction over the primary database:

adjusting information for each database object of the one or more particular database objects, in the object-specific standby information, to reflect the particular timestamp to produce updated object-specific standby information;

wherein the first database system automatically determining whether to offload the query to the second database system is based on the updated object-specific standby information.

16. The one or more non-transitory computer-readable media of claim 15, wherein the one or more sequences of instructions further comprise instructions that, when executed by one or more processors, cause:

the first database system receiving, from the second database system, a message that indicates a current timestamp of the second database system;

in response to receiving the message, the first database system automatically setting each of a set of one or more flags within the object-specific standby information;

wherein each flag of the set of one or more flags is associated with a database object in the set of data that is associated, in the object-specific standby information, with a commit timestamp that is no greater than the current timestamp of the second database system.

17. The one or more non-transitory computer-readable media of claim 16, wherein the first database system automatically determining whether to offload the query to the second database system comprises:

determining whether one or more particular flags, of the set of one or more flags within the object-specific standby information, the one or more particular flags being associated with the one or more query database objects, are set;

in response to determining that the one or more particular flags are set within the object-specific standby information, automatically identifying the query as offload-eligible.

18. The one or more non-transitory computer-readable media of claim 16, wherein:

the first database system automatically determining whether to offload the query to the second database system comprises:

determining whether one or more particular flags, of the set of one or more flags within the object-specific standby information, the one or more particular flags being associated with the one or more query database objects, are set;

in response to determining that at least one flag, of the one or more particular flags, is not set within the object-specific standby information, automatically determining to perform a delayed offload of the query to the second database system based, at least in part, on determining one or more of:

a first database system run-time of the query is estimated to be over a threshold amount of run-time, or the current timestamp of the second database system is within a threshold amount of lag time from a most-recent commit timestamp associated with the one or more query database objects within the object-specific standby information;

automatically identifying the query as offload-eligible once the current timestamp of the second database system reaches the most-recent commit timestamp associated with the one or more query database objects within the object-specific standby information;

the first database system automatically offloads the query in response to determining that the current timestamp of the second database system has reached the most-recent commit timestamp associated with the one or more query database objects within the object-specific standby information.

19. The one or more non-transitory computer-readable media of claim 15, wherein the one or more sequences of instructions further comprise instructions that, when executed by one or more processors, cause:

receiving, at the first database system, a second query over a set of query database objects in the set of data in the primary database;

wherein the object-specific standby information includes a standby database system-specific set of flags for each standby database system of one or more standby database systems that include the second database system;

the first database system automatically determining whether to offload the second query to the one or more standby database systems based, at least in part, on the object-specific standby information comprising, for each standby database system of the one or more standby database systems:

determining that one or more flags, of the standby database system-specific set of flags for said each standby database system, associated with one or more database objects of the set of query database objects, are not set within the object-specific standby information;

in response to determining that each standby database system, of the one or more standby database systems, is associated with one or more unset flags associated with one or more database objects of the set of query database objects within the object-specific standby information, automatically running the second query over the primary database.

20. The one or more non-transitory computer-readable media of claim 16, wherein the message that indicates the current timestamp of the second database system is a heartbeat message from the second database system.

21. The one or more non-transitory computer-readable media of claim 15, wherein the one or more sequences of instructions further comprise instructions that, when executed by one or more processors, cause: in response to detecting the commit of the transaction over the primary database: unsetting any flags, within the object-specific standby information, that are associated with the one or more particular database objects.

22. The one or more non-transitory computer-readable media of claim 14, wherein the one or more sequences of instructions further comprise instructions that, when executed by one or more processors, cause:

the first database system detecting at least one condition of one or more conditions that trigger evaluation of offload-eligibility of the query, wherein the one or more conditions comprise:

the presence of an offload optimizer hint in the query, identification of one or more read-mostly objects in the query, and a run-time of the query is estimated to be over a threshold amount of run-time;

wherein the first database system automatically determining whether to offload the query is performed in response to the first database system detecting at least one condition of the one or more conditions.

23. The one or more non-transitory computer-readable media of claim 14, wherein:
the standby database is a physical replica of the primary database;
the query is part of a transaction initiated on the first database system;
the transaction includes one or more data manipulation language (DML) operations configured to make one or more changes to the set of data prior to the query; and
the one or more sequences of instructions further comprise instructions that, when executed by one or more processors, cause:
prior to automatically submitting, to the second database system, the request to run the query over the copy of the set of data in the standby database, the transaction performing the one or more DML operations, which make the one or more changes to the set of data, to produce an adjusted set of data in the primary database;
wherein the query is configured to run over the adjusted set of data;
wherein automatically submitting, to the second database system, the request to run the query over the copy of the set of data in the standby database is performed prior to the transaction committing.

24. The one or more non-transitory computer-readable media of claim 23, wherein the one or more sequences of instructions further comprise instructions that, when executed by one or more processors, cause, prior to the transaction committing and after the transaction performing the one or more DML operations that make the one or more changes to the set of data:
the first database system sending one or more change records, to the second database system, that reflect the one or more changes to the set of data in the primary database;
wherein the second database system applies the one or more change records to the copy of the set of data in the standby database to produce an adjusted copy of the set of data in the standby database;
wherein the results of the query, received from the second database system, are based on the adjusted copy of the set of data in the standby database.

25. The one or more non-transitory computer-readable media of claim 24, wherein the one or more sequences of instructions further comprise instructions that, when executed by one or more processors, cause:
the first database system automatically establishing a first session on the second database system;
causing one or more session parameters, of the first session, to have values of one or more corresponding session parameters of a second session, on the first database system, that runs the transaction;
the second database system running the query, within the first session, over the adjusted copy of the set of data based, at least in part, on the one or more session parameters, of the first session, having the values of the one or more corresponding session parameters of the second session.

26. The one or more non-transitory computer-readable media of claim 14, wherein the one or more sequences of instructions further comprise instructions that, when executed by one or more processors, cause before the first database system automatically determining whether to offload the query to a second database system:
based on the object-specific information, the first database system determining that at least one of the one or more query database objects is not up-to-date; and
in response to the first database system determining that at least one of the one or more query database objects is not up-to-date, determining to perform a delayed offload of the query.

* * * * *

UNITED STATES PATENT AND TRADEMARK OFFICE
CERTIFICATE OF CORRECTION

PATENT NO.          : 11,468,060 B2
APPLICATION NO.     : 16/016978
DATED               : October 11, 2022
INVENTOR(S)         : Sonawane et al.

It is certified that error appears in the above-identified patent and that said Letters Patent is hereby corrected as shown below:

On the Title Page

On page 2, Column 2, under Other Publications, Line 4, delete "writepy-on-write vs Redirect-on-write" and insert -- write --, therefor.

In the Drawings

On sheet 10 of 10, in FIG. 8, under Reference Numeral 830, Line 1, delete "( VMM)" and insert -- (VMM) --, therefor.

In the Specification

In Column 18, Line 34, delete "SQL/WL" and insert -- SQL/XML --, therefor.

In the Claims

In Column 28, Line 57, in Claim 15, after "readable" insert -- media of --, therefor.

Signed and Sealed this
Twenty-first Day of March, 2023

Katherine Kelly Vidal
*Director of the United States Patent and Trademark Office*